Figure 1:
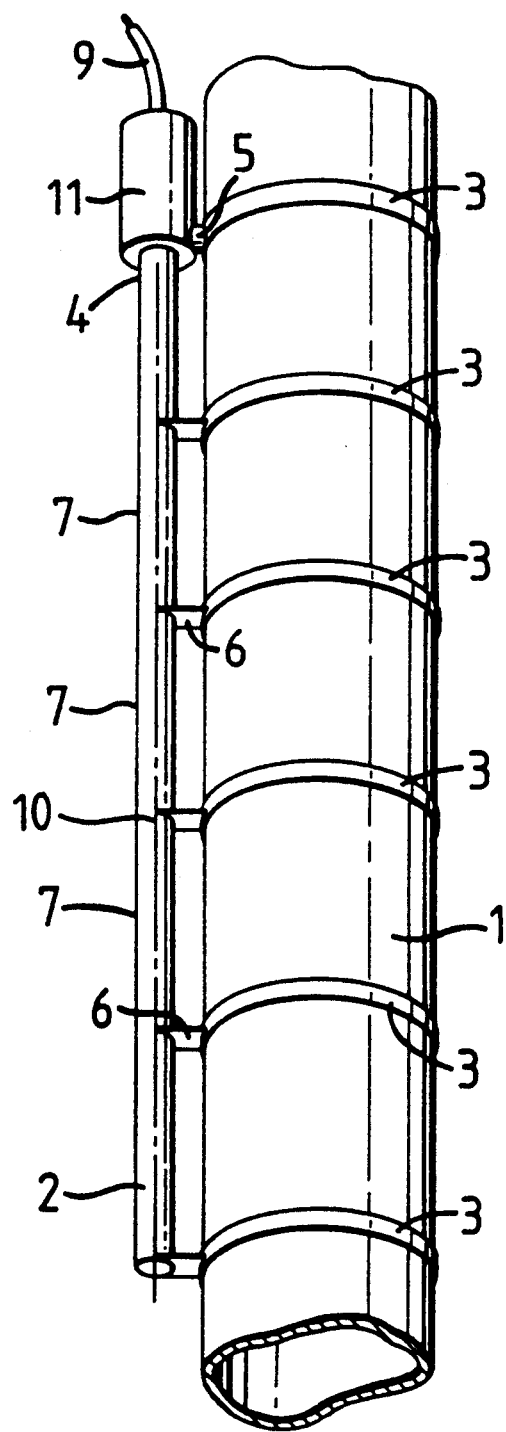

United States Patent [19]

Ashpitel et al.

[11] Patent Number: 5,065,631
[45] Date of Patent: Nov. 19, 1991

[54] GAUGE FOR MEASURING BENDING OF STRUCTURES

[75] Inventors: William G. Ashpitel, Weybridge; Ralph G. W. Parsons, Staines, both of England

[73] Assignee: The British Petroleum Company, p.l.c., London, England

[21] Appl. No.: 281,571

[22] Filed: Dec. 8, 1988

[30] Foreign Application Priority Data

Dec. 12, 1987 [GB] United Kingdom ............... 8729061

[51] Int. Cl.[5] ............................................. G01N 3/20
[52] U.S. Cl. ....................................... 73/849; 73/786
[58] Field of Search ................. 73/849, 786, 760, 781, 73/782, 862.65, 812

[56] References Cited

U.S. PATENT DOCUMENTS

| | | | |
|---|---|---|---|
| 3,411,348 | 11/1968 | Schultheis, Jr. | 73/862.65 |
| 3,599,479 | 8/1971 | Kutsay | 73/862.65 X |
| 3,621,437 | 11/1971 | Mading . | |
| 3,914,991 | 10/1975 | Fletcher et al. . | |
| 4,174,628 | 11/1979 | van den Bussche et al. . | |
| 4,355,307 | 10/1982 | Beck . | |
| 4,452,087 | 6/1984 | D'Antonio | 73/786 |

FOREIGN PATENT DOCUMENTS

| | | |
|---|---|---|
| 0093298 | 4/1983 | European Pat. Off. . |
| 5610195 | 6/1981 | Japan . |
| 2156519 | 8/1985 | United Kingdom . |

OTHER PUBLICATIONS

Raj, D. et al. Testing Power Generation Equipment, Mechanical Engineering, Dec. '85, pp. 38–46.
Oldyrer, P. P. Strain Gauge for Measuring . . . Specimens, Ind. Lab. (U.S.A.) vol. 44, No. 9, Sep. '78, pp. 1307–1308.

Primary Examiner—Jerry W. Myracle
Attorney, Agent, or Firm—D. J. Untener; L. W. Evans

[57] ABSTRACT

A gauge for measuring bending of structures comprises a bending bar which may be attached to the structure so that it bends in response to bending of the structure and having means for measuring bending of the bar whereby measurement of bending of the bar enables bending of the structure to be determined. Preferably, the bar is hollow with strain gauges on its inner surface and is attached so that at least part of it may move longitudinally along its axis with respect to the structure.

16 Claims, 3 Drawing Sheets

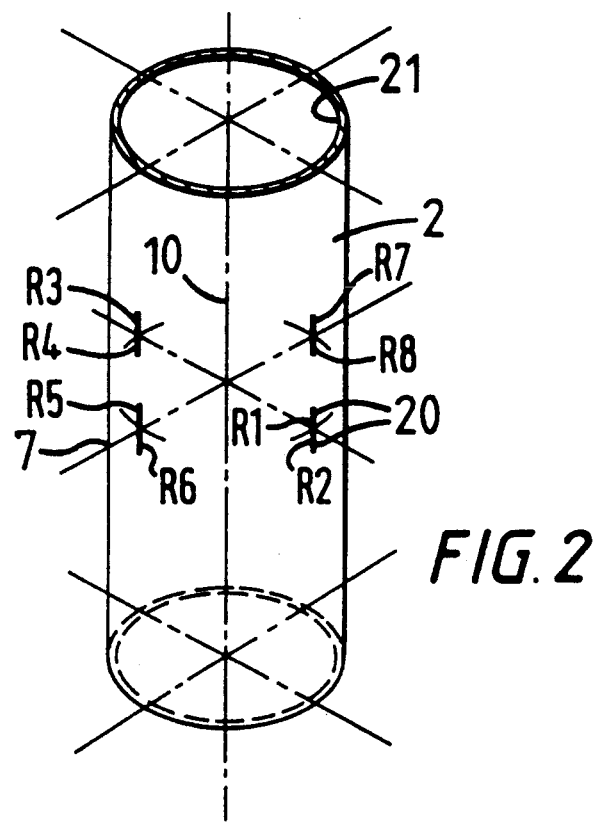
*FIG. 2*
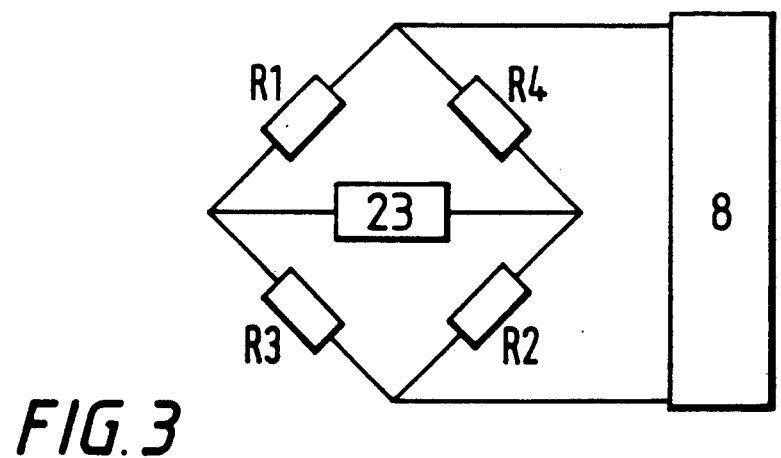
*FIG. 3*
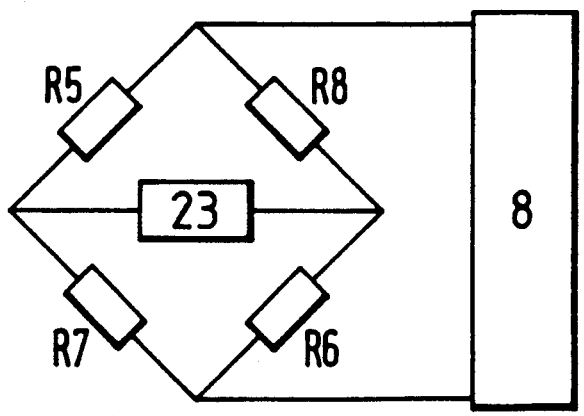

GAUGE FOR MEASURING BENDING OF STRUCTURES

This invention relates to a gauge and in particular a gauge for measuring bending of structures.

Bending stresses in structures such as metal subsea risers can cause fatigue which reduces the working life of the structure, hence it is of considerable importance to know the magnitude of these stresses. Known methods of measuring these stresses include fixing strain gauges directly to the stressed metal of the structure. Usually any protective coat on the structure has to be removed to gain access to the metal which may increase the risk of corrosion occurring. Also the section of the structure that is to be measured may have to be taken out of service while the strain gauges are installed. Furthermore, the strain gauges are connected to amplifiers by means of long leads which may be difficult to protect from impact etc.

An alternative method of measuring bending stresses is by clamping gauge bars around the structure and measuring the changes in length of the bars. This method is an extension of the above method, but the requirement for taking the structure out of service is removed. The main disadvantage of this method is that the clamps that hold the gauge bars must be very rigid and must not move relative to the structure. This may make them difficult to install. Furthermore, a large number of gauge bars must be installed between the clamps. This results in a stiffening of the structure thereby reducing the bending over the section being measured and causing errors in the measurements being recorded. Also, the physical form of the equipment used results in an increase in the local effect of the environment, for example, waves and currents etc. on the structure. Once installed the equipment has to be calibrated by subjecting the structure to known bends or loads, a procedure which can prove to be difficult.

In the above methods using strain gauges, changing the tension in the structure will change the strains seen by the strain gauges, thus each measured strain is the combination of that caused by bending and that caused by the overall tension in the structure. Thus, further calculation may be required to obtain the actual bending stresses. The effect of tension in the structure may also be removed by mounting the strain gauges or gauge bars in bridge arrangements but for good directional sensitivity more than one bridge arrangement may be required and this increases the problems associated with fixing the gauges or the bars to the structure.

Thus according to the present invention there is provided a gauge suitable for measuring bending of a structure, the gauge comprising a bending bar having means for attaching the bar to the structure and means for measuring bending of the bar, the attaching means being adapted to allow the bar to bend in response to bending of the structure, whereby measurement of bending of the bar enables bending of the structure to be determined.

Preferably, the attaching means may comprise clamps with mountings, which allow at least part of the bar to move longitudinally along its axis with respect to the structure. The mountings may be longitudinally slideable mountings or may be flexible plates which are free to bend to allow at least part of the bar to move along its axis. Preferably, part of the bar is attached to the structure so that it cannot move in any direction with respect to the structure. The bar may have any suitable cross-section and may be hollow. The bar may be uniform throughout its length. The bend measuring means may be one or more strain measuring devices mounted on the bending bar. Preferably the strain measuring devices are strain gauges and most preferably, the bending bar is hollow and the bend measuring means comprises one or more strain gauges mounted on the inner surface of the hollow bending bar. The strain gauges may be connected to amplifiers in an enclosure which may be mounted at the part of the bar which is fixed rigidly to the structure, or may be mounted remotely from the bending bar. The bend measuring means may comprise one or more bridge arrangements each comprising four strain gauges mounted as opposed pairs on the bending bar and connected to a bend output amplifier. Preferably, the bend measuring means comprises a pair of four-strain-gauge-bridge arrangements mounted orthogonal to one another. Most preferably, the bend measuring means comprises more than one pair of four-strain-gauge-bridge arrangements.

It is envisaged that if the bend measuring means comprises a single strain measuring device mounted on the bending bar then a bend having a component with a radius parallel to the line between the neutral axis of the bar and the device may be measured. It is further envisaged that if the bend measuring means comprises four strain gauges mounted in opposed pairs in a strain gauge bridge arrangement on the bending bar then a bend component having a radius parallel to the line between the pairs of gauges may be measured. It is yet further envisaged that if the bend measuring means comprises a pair of four-strain-gauge-bridge arrangements mounted orthogonal to one another then a bend of the bending bar and hence the structure may be expressed as two orthogonal components each corresponding to one of the bridges.

In use, the bend measuring means of the bending bar may be calibrated prior to attaching it to the structure. When the bending bar is attached to the structure, the attaching means allows the bending bar to bend in response to dynamic bending of the structure, and so by measuring bending of the bending bar, the bending of the structure may be determined. The bending stresses in the structure may be calculated from the bending of the structure by known techniques. By calibrating the bend measuring means against an unbent reference structure prior to attaching the bending bar to the structure, the static bend of the structure may be determined from the initial bend of the bending bar in the absence of irregularities in the surface of the structure or the attaching means and the like. It is believed that in the preferred embodiment, wherein the bending bar is free to move longitudinally along its axis with respect to the structure, the effect of tension in the structure on the bending bar and hence the bend measuring means is reduced. The effect of tension in the structure on the bending bar may be removed by mounting strain gauges in a bridge arrangement. In the preferred embodiment, wherein the bending bar is free to move longitudinally along its axis with respect to the structure, it is believed to be possible to measure bending stresses in the structure up to the yield stress of the structure. It is believed that this also has a less stiffening effect on the structure than a plurality of rigidly mounted gauge bars.

The gauge according to the present invention may be used to measure bending in structures such as subsea risers on oil rigs. It is believed that the gauge of the present invention offers the advantage of limiting the effect of the gauge on the stiffness and local environmental effect on the structure so that more reliable measurements may be made. The number of stain gauges mounted inside a hollow bending bar may be increased to increase the sensitivity of the measurements without increasing the effect of the gauge on the stiffness of the structure or other associated disadvantages.

The gauge according to the present invention may have numerous other applications, for example, for measuring bending in structures such as bridges, subsea pipelines, buildings, crane jibs, oil exploration and production platforms and the like. It may also be used where access to only one side of a structure is available or where it is difficult or undesirable to fix strain gauges directly to the structure.

According to the present invention there is also provided a method for measuring bending of structures using the gauge as herein described. The method comprising attaching to the structure a gauge according to the present invention so that the bending bar bends in response to bending of the structure and measuring the bending of the bar so as to determine bending of the structure.

The gauge and method according to the present invention will now be described by way of example only and with reference to the accompanying drawings.

Figure 4:
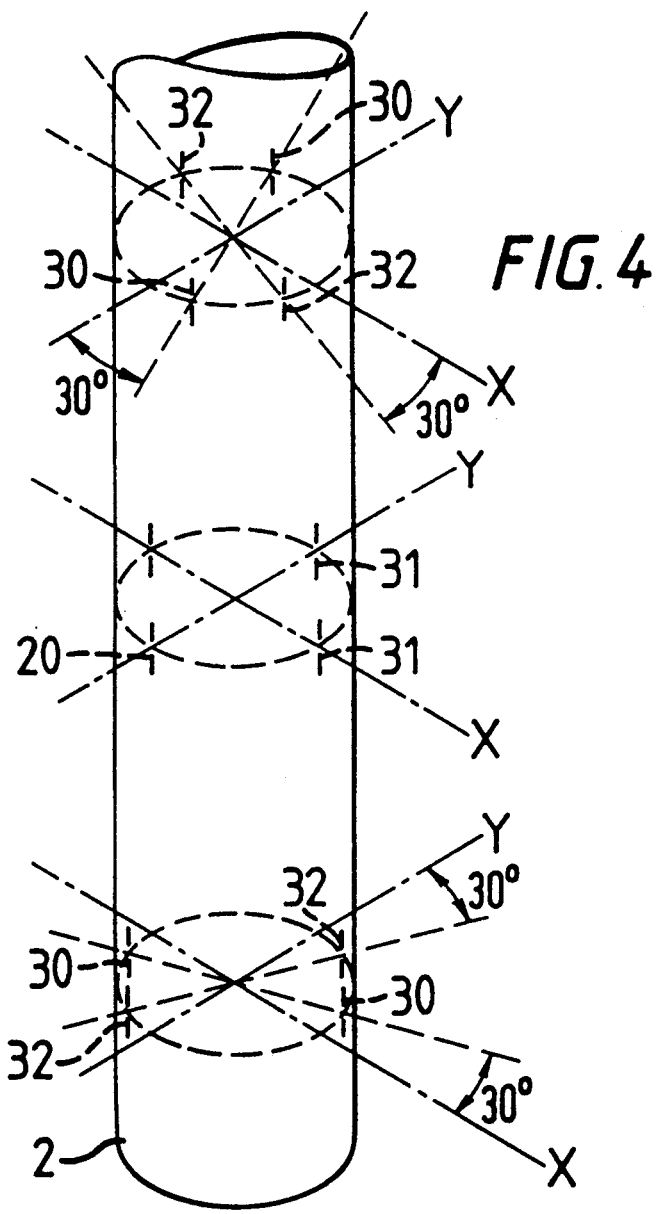
Figure 5:
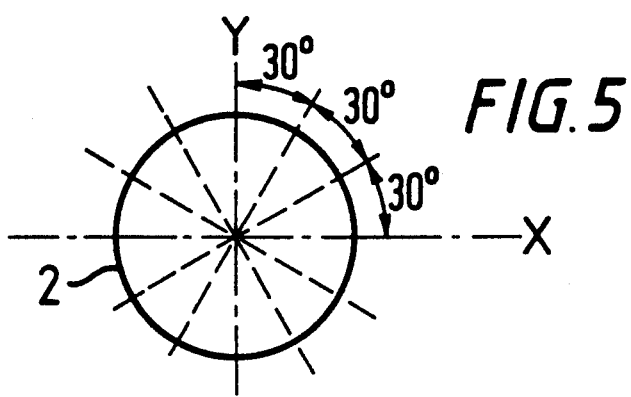

FIG. 1 represents a pipe structure such as a subsea riser having a gauge according to the present invention. FIG. 2 represents a part of a bending bar according to the present invention showing the location for an orthogonal pair of internal strain gauge bridges and FIG. 3 shows how these strain gauges may be connected in an electronic circuit. FIG. 4 shows the locations of 24 strain gauges in a bending bar according to the present invention. FIG. 5 shows an end view of the bending bar in FIG. 4.

In FIG. 1 a pipe structure which was a 12 inch subsea riser (1) had a bending bar (2) attached by means of clamps (3). One end (4) of the bending bar was attached to the clamps (3) by a rigid mounting (5) so that it could not move in any direction with respect to the riser (1). The remainder of the bending bar was attached to the clamps (3) by flexible mountings (6) which allowed longitudinal movement along the axis (10) of the bar with respect to the riser (1). The mountings (6) were flexible metal plates which were free to bend to allow the bar to move along its axis (10). The bending bar (2) was in the form of a uniform hollow tube. Inside the bending bar strain gauges (not shown) were mounted on the inner surface (not shown) in groups of eight in positions (7) mid-way between the mountings (6). The strain gauges were connected to amplifiers (not shown) in a housing (11) and the amplifiers were connected to a power supply and data logger (not shown) by a cable (9).

FIG. 2 shows the configuration of one group of eight strain gauges (20) (R1 to R8) mounted on the inner surface (21) of the bending bar (2) at position (7) shown in FIG. 1. The gauges were mounted as two orthogonal strain gauge bridges, each of which comprised diametrically opposed pairs of gauges in a common plane. The bridges were mounted orthogonally to each other so that a bend of the bar at that point could be measured as two orthogonal components, one in each of the planes of the bridges. Suitable strain gauges are HBM type: 3/350LY11 of Micromeasurement type NK-06-S022H-50C.

FIG. 3 shows the electronic circuits for each of the two strain gauge bridges shown in FIG. 2. The bridge circuits were connected to suitable power supplies (23) and amplifiers (8) such as Analog Devices 2431L or Technimeasure type SGA 708 which are combined power supplies and amplifiers.

FIG. 4 shows the positions of three groups (30, 31, 32) each of eight strain gauges (20) mounted inside a bending bar (2). Each group of eight strain gauges comprised a pair of orthogonally mounted strain gauge bridges each of which comprises two diametrically opposed pairs of gauges in a common plane. This arrangement used a total of 24 strain gauges (20). The orthogonal pairs of bridges were mounted at 30° intervals to each other as shown (reference planes X and Y are shown for clarity). To facilitate wiring for two of the sets (30, 32) of orthogonal pairs of bridges, the bridges were mounted at opposite ends of the arrangement. The longitudinal distance between the bridges was small relative to the radius of curvature of the bend of the riser to be measured. The bridges were mounted typically in positions (7) midway between the mountings (6) of the bar as shown in FIG. 1 using a method similar to that described in Mechanical Engineering, December, 1988 pages 35 to 46. On assembly, in order to accurately maintain the positional relationship between the 24 strain gauges, they were first accurately positioned on the back of a flexible printed circuit (not shown). Electrical links were made between the gauges and to the flexible printed circuit, the printed circuit electrically formed the bridge circuits for the gauges as in FIG. 3 and extended as far as the amplifiers (8). The flexible printed circuit was wrapped around the outside of an insertion tool (not shown). The tool comprised a length of rubber tube on the outside of a metal tube. One end of the metal tube was sealed. The rubber tube was sealed to the metal tube at each end of the rubber (the rubber tube being shorter than the metal tube). The metal tube had holes which allow the rubber tube to be pressurised with gas through the open end of the metal tube. Normal strain gauge preparation was given to the inner surface of the bending bar and also to the gauges mounted on the flexible printed circuit. Adhesive was applied to both the gauges (20) and the inner surface of the bar. The flexible printed circuit mounted on the tool was inserted into the bar and the rubber tube pressurised to expand it and press the flexible printed circuit and the gauges onto the inner surface of the bar. After the adhesive had cured, the pressure was released from the tool and the tool was removed from the bar. Heat may also be applied to cure the adhesive. The output of the bend output amplifiers (8) was calibrated by subjecting the bending bar to known bends using a four point bending rig prior to attachment to the riser. The device was easily attached by a diver. In use, the bending bar bent in response to bending of the riser. Changes in resistance of the strain gauges due to bending of the bending bar were amplified by the bend output amplifiers to give the components of the bend for each bridge. From these, bending of the bending bar and hence the riser could be determined. From this, the bending stresses in the riser could be calculated using conventional techniques. By using more than two bridge pairs a degree of redundancy was introduced and the direction of the bend could be more accurately determined.

FIG. 5 shows an end view of the bending bar in FIG. 4 to show the 30° interval between the planes of the strain gauge bridges.

We claim:

1. A gauge suitable for measuring bending of a structure in which the gauge comprises in combination:
   (a) a bending bar having a longitudinal axis,
   (b) means for measuring bending of said bar, and
   (c) attaching means capable of attaching said bending bar to said structure so as to allow said bar to bend in conformity to the bending in any direction of said structure, said attaching means comprising clamps having mountings which in use, allow at least part of said bar to move longitudinally along its axis with respect to said structure,
   whereby measurement of bending of said bar enables bending of said structure to be determined.

2. A gauge according to claim 1 in which said attaching means are adapted so that in use, part of said bar is fixed with respect to any direction of said structure.

3. A gauge according to claim 1 in which said bend measuring means comprises one or more strain measuring devices mounted on the bending bar.

4. A gauge according to claim 3 in which said strain measuring devices comprise strain gauges.

5. A gauge according to claim 4 in which said strain gauges are mounted as strain gauge bridges comprising four gauges mounted in opposed pairs.

6. A gauge according to claim 5 having a pair of strain gauge bridges orthogonal to each other.

7. A gauge according to claim 6 having three pairs of orthogonal gauge bridges.

8. A gauge according to claim 5 in which said bend measuring means comprises more than one pair of strain gauge bridges.

9. A gauge according to claim 4 in which said strain gauges are connected to amplifiers.

10. A gauge according to claim 3 in which said bar is hollow and said strain gauges are mounted on the inner surface of said bar.

11. A method of measuring bending of a structure comprising:
    (a) attaching to said structure a gauge, said gauge comprises a bending bar having a longitudinal axis, means for measuring bending of said bar and attaching means capable of attaching said bar to said structure so that said bar bends in conformity to the bending in any direction of said structure, said attaching means comprising clamps having mountings which in use, allow at least part of said bar to move longitudinally along its axis with respect to said structure, and
    (b) measuring bending of said bar so as to determine bending at said structure.

12. A method of measuring bending of a structure according to claim 11 wherein said bending bar is hollow, said means for measuring comprise strain gauges, and said strain gauges are connected to amplifiers.

13. A method of measuring bending of a structure according to claim 12 wherein said bending bar is prepared by positioning strain gauges on a flexible printed circuit, making electrical links between said strain gauges and to said flexible printed circuit, inserting said flexible printed circuit and strain gauges into said bending bar and onto the inner surface of said bending bar, and calibrating said gauge by subjecting said bending bar to known bends.

14. A method of measuring bending of a structure according to claim 12, wherein said step of measuring includes amplifying changes of resistance of said strain gauges and determining the components of the bend.

15. A method of measuring bending of a structure according to claim 12 wherein four of said strain gauges are mounted in opposed pairs in a bridge arrangement and including measuring a bend component having a radius parallel to the line between the pairs of said strain gauges.

16. A method of measuring bending of a structure according to claim 11, including measuring a bend component with a radius parallel to the line between the neutral axis of said bending bar and said means for measuring.

* * * * *